April 2, 1968   J. E. WILKINSON   3,375,817
COOKER WITH MEANS TO VARY GRILL HEIGHT
Filed May 11, 1966
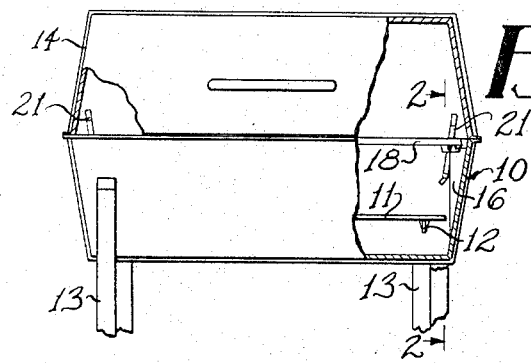
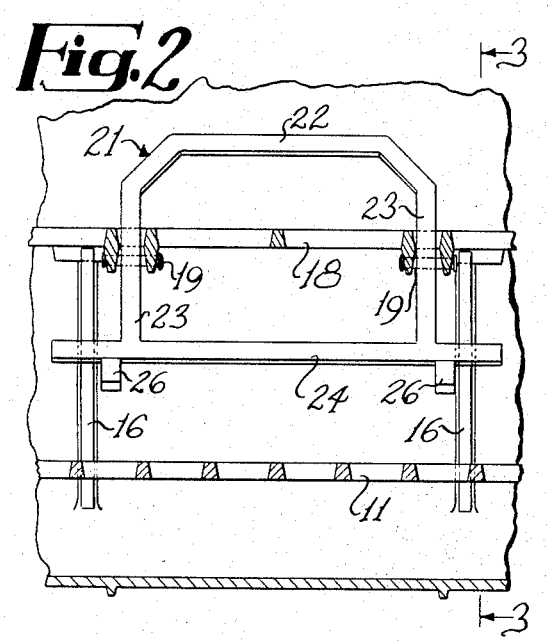
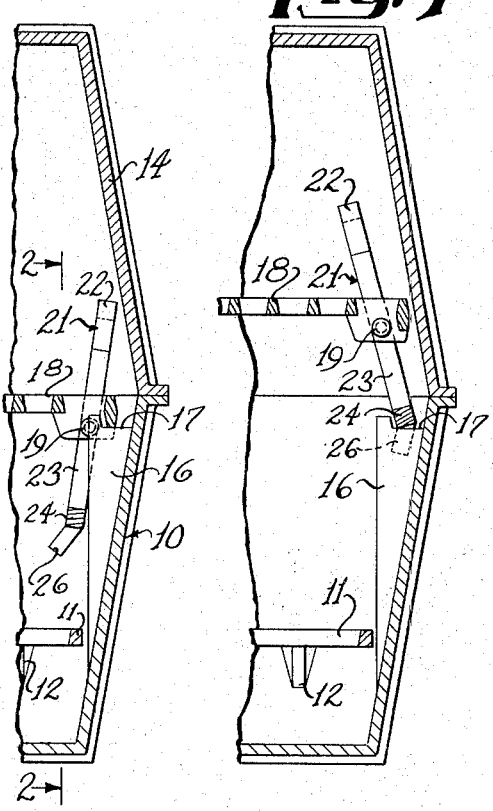
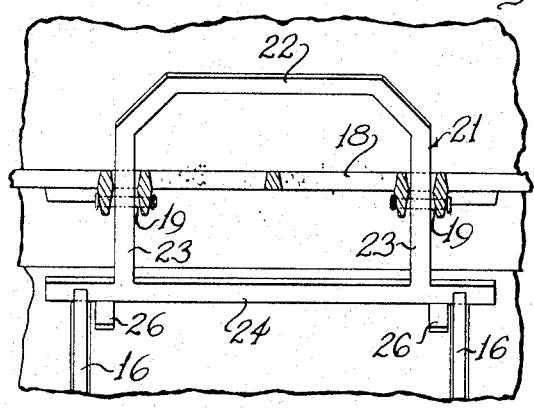
INVENTOR.
Judkins E. Wilkinson
BY
Jennings, Carter & Thompson
Attorneys

United States Patent Office 3,375,817
Patented Apr. 2, 1968

3,375,817
COOKER WITH MEANS TO VARY
GRILL HEIGHT
Judkins E. Wilkinson, Birmingham, Ala., assignor to
Atlanta Stove Works, Inc., a corporation of Georgia
Filed May 11, 1966, Ser. No. 549,258
5 Claims. (Cl. 126—25)

This invention relates to an outdoor cooker and more particularly to such a cooker which shall have an adjustable grill which may be supported at selected elevations.

An object of my invention is to provide an outdoor cooker of the character designated in which the grill is of a shape and size to be supported on support brackets carried by a fire box and the grill carries depending support members which are disposed to move from an inner position with the grill supported on the support brackets to an outer position with each support member engaging an adjacent support bracket to thus support the grill at an elevation above the support brackets.

Another object of my invention is to provide an outdoor cooker of the character designated in which an upstanding handle member is operatively connected to the depending support members for the grill whereby upon inward movement of the handle members, the depending support members move outwardly to a position to engage subjacent support brackets.

A further object of my invention is to provide an outdoor cooker of the character designated in which the handle members are of a generally inverted U-shape whereby upon lifting the handle members, they naturally move inwardly toward each other to thus force the depending support members outwardly to engage the subjacent support brackets.

A still further object of my invention is to provide an outdoor cooker which shall be extremely simple of construction, economical of manufacture and one which includes means to positively hold the grill at selected elevations.

An outdoor cooker embodying the features of my invention is illustrated in the accompanying drawing, in which:

FIGURE 1 is a side elevational view, partly broken away and in section;

FIGURE 2 is an enlarged fragmental view taken generally along the line 2—2 of FIGURE 1;

FIGURE 3 is a fragmental sectional view taken generally along the line 3—3 of FIGURE 2;

FIGURE 4 is a fragmental sectional view similar to FIGURE 3 but showing the grill in elevated position; and FIGURE 5 is a view similar to FIGURE 2 showing the grill in elevated position.

Referring now to the drawing for a better understanding of my invention, my outdoor cooker comprises an upwardly opening fire box indicated generally at 10. A horizontal grate 11 is supported in spaced relation to the bottom of the fire box 10 by suitable support brackets 12. The fire box 10 may be supported by suitable depending legs 13. Also, a downwardly opening cover 14 engages the upper edge of the fire box 10, as shown.

Formed integrally with the walls of the fire box 10 are inwardly extending support brackets 16. A pair of the support brackets 16 are provided at each end of the fire box 10, as shown in FIGURES 2 and 5. The upper end of each support bracket 16 is provided with a recess 17, as clearly shown in FIGURES 3 and 4.

A grill 18 extends horizontally across the upper portion of the fire box 10 with portions thereof engaging the recesses 17, as shown in FIGURES 2 and 3. Pivotally connected to the grill 18 by pivot pins 19 are support members indicated generally at 21. Each support member 21 comprises a generally inverted, U-shaped member having a base 22 and depending legs 23. The pivot pins 19 pass through the legs 23 whereby the support member 21 is adapted for pivotal movement relative to the grill 18. Formed integrally with the lower ends of the legs 23 is an elongated, bar-like member 24 which is of a length to span a pair of the support brackets 16, as shown in FIGURES 2 and 5. Suitable stop members 26 are provided on the bar-like members 24 in position to engage the support brackets 16 and thus limit longitudinal movement of the bar-like members 24 relative to the support brackets.

From the foregoing description, the operation of my improved outdoor cooker will be readily understood. The base 22 of the U-shaped support member 21 serves as a handle whereby the support members may be pivoted about the pivot pins 19. To support the grill 18 at a lower elevation, the support members 21 are pivoted whereby the lower ends thereof move inwardly to the position shown in FIGURE 3. The edges of grill 18 thus engage the recesses 17 to support the grill 18 in the position shown in FIGURES 2 and 3.

To elevate the grill 18, the operator merely lifts up on the handle members or bases 22 whereby the support members 21 are naturally pivoted to the position shown in FIGURE 4. That is to say, as the bases 22 at opposite ends of the grill are lifted they naturally move inwardly toward each other to thus force the lower depending ends of the support members outwardly in position to engage the recesses 17, as shown in FIGURE 4, to support the grill at a substantial elevation above the recess 17. The detents or stops 26 extend downwardly alongside the support brackets 16 to thus limit longitudinal movement of the bar-like members 24 relative to the support brackets.

From the foregoing, it will be seen that I have devised an improved outdoor cooker having a grill which may be quickly and easily moved to selected elevations relative to the fire box. By providing the pivoted support member 21 adjacent oppostie ends of the grill 18, the lower ends of the support members naturally move outwardly upon lifting both of the support members at the same time. Accordingly, the operator merely lifts the bases 22 whereupon the lower ends of the support members 21 automatically move to proper position to engage the recesses 17 and thereby support the grill at the elevated position.

While I have shown my invention in but one form, it will be obvious to those skilled in the art that it is not so limited, but is susceptible of various changes and modifications without departing from the spirit thereof, and I desired, therefore, that only such limitations shall be placed thereupon as are specifically set forth in the appended claims.

I claim:
1. An outdoor cooker comprising:
 (a) an upwardly opening fire box,
 (b) support brackets carried by and extending inwaruly of said fire box,
 (c) a grill of a shape and size to be supported on said support brackets,
 (d) support members operatively connected to said grill adjacent said support brackets, and
 (e) each of said support members having a depending member disposed to move from an inner position with said grill supported on said support brackets to an outer position with each support member engaging an adjacent support bracket to support said grill at an elevation above said support brackets.

2. An outdoor cooker as defined in claim 1 in which each support member is provided with an upstanding handle member which is moved inwardly to move said depending member outwardly into engagement with an adjacent support bracket.

3. An outdoor cooker as defined in claim 1 in which a pair of spaced apart support brackets are mounted at opposite sides of said grill and an elongated bar-like member is carried by an adjacent pair of said depending members in position to engage said pairs of support brackets upon outward movement of said depending members to support said grill at an elevation above said support brackets.

4. An outdoor cooker as defined in claim 3 in which said pair of depending members are formed integrally with a generally inverted U-shaped handle which is moved inwardly to position said elongated bar-like member in engagement with said pair of support brackets.

5. An outdoor cooker as defined in claim 3 in which detents are carried by said bar-like member in position to engage said support brackets and limit longitudinal movement of said bar-like members.

References Cited

UNITED STATES PATENTS

| | | | |
|---|---|---|---|
| 3,285,239 | 11/1966 | Drake | 126—25 |
| 3,306,281 | 2/1967 | Hoebel | 126—25 |

FREDERICK KETTERER, *Primary Examiner.*